United States Patent [19]

Berfield

[11] Patent Number: 5,743,019
[45] Date of Patent: *Apr. 28, 1998

[54] ROTARY FLAIL FEEDING DEVICE AND METHOD

[76] Inventor: Robert C. Berfield, R. R. #4, Box 359, Jersey Shore, Pa. 17740

[*] Notice: The term of this patent shall not extend beyond the expiration date of Pat. No. 5,672,897.

[21] Appl. No.: 472,188

[22] Filed: Jun. 7, 1995

[51] Int. Cl.⁶ .................................................. B26B 27/00
[52] U.S. Cl. .......................... 30/276; 56/12.7; 242/564; 242/566
[58] Field of Search ................................ 242/564, 566, 242/557, 597.8, 613.1; 30/276, 347; 56/12.7, 295

[56] References Cited

U.S. PATENT DOCUMENTS

| | | | |
|---|---|---|---|
| Re. 32,629 | 3/1988 | Baba et al. | 30/276 |
| 3,664,102 | 5/1972 | Reber | 56/295 |
| 3,708,967 | 1/1973 | Geist et al. | 56/12.7 |
| 3,859,776 | 1/1975 | Ballas et al. | 56/12.7 |
| 3,895,440 | 7/1975 | Pittinger, Jr. | 30/347 |
| 3,928,911 | 12/1975 | Pittinger, Jr. | 30/276 |
| 4,020,553 | 5/1977 | Pittinger | 30/347 |
| 4,035,912 | 7/1977 | Ballas et al. | 30/276 |
| 4,035,915 | 7/1977 | Pittinger, Jr. | 30/347 |
| 4,077,191 | 3/1978 | Pittinger, Sr. et al. | 56/12.7 |
| 4,091,536 | 5/1978 | Bartholomew | 30/276 |
| 4,095,338 | 6/1978 | Naohiko et al. | 30/276 |
| 4,104,796 | 8/1978 | Sheldon | 30/276 |
| 4,118,864 | 10/1978 | Pittinger, Sr. et al. | 30/276 |
| 4,138,810 | 2/1979 | Pittinger, Sr. et al. | 30/276 |
| 4,183,138 | 1/1980 | Mitchell et al. | 30/276 |
| 4,209,902 | 7/1980 | Moore et al. | 30/276 |
| 4,211,004 | 7/1980 | Woods | 30/276 |
| 4,223,440 | 9/1980 | Inaga | 30/276 |
| 4,233,735 | 11/1980 | Tsuchiya | 30/276 |
| 4,236,312 | 12/1980 | Foster et al. | 30/276 |
| 4,244,103 | 1/1981 | Snarr | 30/276 |
| 4,245,454 | 1/1981 | Zien | 56/12.7 |
| 4,274,201 | 6/1981 | Oberg et al. | 30/276 |
| 4,281,505 | 8/1981 | Fuelling, Jr. et al. | 56/12.7 |
| 4,285,127 | 8/1981 | Zerrer et al. | 30/276 |
| 4,290,200 | 9/1981 | Lombard | 30/276 |
| 4,316,325 | 2/1982 | Brucker | 30/276 |
| 4,335,510 | 6/1982 | Close et al. | 30/276 |
| 4,335,568 | 6/1982 | Langenstein | 56/12.7 |
| 4,347,666 | 9/1982 | Moore | 30/276 |
| 4,352,243 | 10/1982 | Lombard | 30/276 |
| 4,366,621 | 1/1983 | Mitchell | 30/276 |
| 4,366,622 | 1/1983 | Lombard | 30/276 |
| 4,411,069 | 10/1983 | Close et al. | 30/276 |

(List continued on next page.)

OTHER PUBLICATIONS

Japanese Utility Model Gazette Laid Open, Jan. 1, 1980–Jun. 30, 1996, pp. 1–4.
Japanese Patent Gazette Laid Open, Jul. 1, 1971–Jun. 30, 1996, pp. 1–16.
Japanese Patent Laid Open No. 63,224, Figs. 1–2, 1976, p. 108.
Japanese Patent Laid Open no. 54,833, Figs. 1–15, 1979, pp. 145–147.
Japanese Patent Laid Open No. 500,767, Figs 1 8, 1982, pp. 34–35.
Four sheets of drawings disclosing a McCulloch "bump-–feed" trimmer head which was on sale in the United States more than one year prior to the filing date of the present invention.
Nicholas P. Chironis, *Mechanisms & Mechanical Devices Sourebook*, pp. 220–227 (McGraw–Hill 1991).

Primary Examiner—John M. Jillions
Attorney, Agent, or Firm—Thomas Hooker, P.C.

[57] ABSTRACT

A rotary flail feeding device includes a rotary enclosure for a large diameter coil of flail, a central post with a small diameter flail winding surface located inside the enclosure and an annular opening in the external surface of the enclosure surrounding the post. When the device is rotated flail from the coil is wound around the small diameter flail winding surface and extends out through the annular opening and away from the device.

72 Claims, 11 Drawing Sheets

U.S. PATENT DOCUMENTS

| | | | |
|---|---|---|---|
| 4,419,822 | 12/1983 | Harris | 30/276 |
| 4,426,780 | 1/1984 | Foster | 30/276 |
| 4,476,632 | 10/1984 | Proulx | 30/276 |
| 4,483,069 | 11/1984 | Moore | 30/276 |
| 4,493,151 | 1/1985 | Mitchell | 30/276 |
| 4,524,515 | 6/1985 | Oberg | 30/276 |
| 4,550,499 | 11/1985 | Ruzicka | 30/276 |
| 4,557,052 | 12/1985 | Baba et al. | 30/276 |
| 4,566,189 | 1/1986 | Muto | 30/276 |
| 4,584,771 | 4/1986 | Tillotson | 30/276 |
| 4,599,796 | 7/1986 | Baba | 30/276 |
| 4,607,431 | 8/1986 | Gay | 30/276 |
| 4,651,421 | 3/1987 | Zerrer | 30/347 |
| 4,660,286 | 4/1987 | Engelbrecht et al. | 30/276 |
| 4,667,410 | 5/1987 | Weid et al. | 30/347 |
| 4,707,919 | 11/1987 | Tsuchiya | 30/276 |
| 4,817,288 | 4/1989 | Hirose et al. | 30/276 |
| 4,835,867 | 6/1989 | Collins et al. | 30/276 |
| 4,852,258 | 8/1989 | Foster | 30/276 |
| 4,866,846 | 9/1989 | Hoffman et al. | 30/276 |
| 4,897,923 | 2/1990 | Collins | 30/276 |
| 4,926,557 | 5/1990 | Haupt | 30/276 |
| 4,942,664 | 7/1990 | Zatulovsky | 30/276 |
| 4,959,904 | 10/1990 | Proulx | 30/276 |
| 4,989,321 | 2/1991 | Hoffmann | 30/276 |
| 5,010,649 | 4/1991 | Hoffmann | 30/276 |
| 5,020,224 | 6/1991 | Haupt | 30/276 |
| 5,036,648 | 8/1991 | Hoffmann et al. | 56/12.1 |
| 5,063,673 | 11/1991 | Webster | 30/276 |
| 5,095,688 | 3/1992 | Fabrizio | 56/12.7 |
| 5,109,607 | 5/1992 | Everts | 30/276 |
| 5,174,100 | 12/1992 | Wassenberg | 56/12.7 |
| 5,276,968 | 1/1994 | Collins et al. | 30/276 |
| 5,339,526 | 8/1994 | Everts | 30/276 |
| 5,566,455 | 10/1996 | Hagstrom | 30/276 | ered. 5,743,019

ROTARY FLAIL FEEDING DEVICE AND METHOD

TECHNICAL FIELD

The present invention relates generally to dispensing devices, and more particularly to a flail feeding device for a powered implement.

BACKGROUND ART

Many devices have been designed which dispense a quantity of an item or product. For example, a powered lawn and garden implement, such as a string trimmer, may include a string head rotated by an electric motor or gas engine with a length of flail, typically in the form of a nylon line, stored in the head. Various devices have been proposed for feeding the flail outwardly from the head. The most common device currently in use includes a bumpfeed mechanism wherein string stored on a spool is selectively fed out by bumping a button on the bottom of the head on a surface as the head is rotating. Interengaging teeth or dogs are thereby released from one another, permitting relative movement of the spool and the head in a direction which causes flail stored on the spool to be fed outwardly through eyelets or apertures in the head.

Other types of feeding devices have been proposed wherein an actuator may be selectively energized by an operator of the device to feed flail stored on a spool. The spool may be stored in or near the lower end of the string trimmer or may be stored at or near the upper end of the trimmer near the handle.

A still further type of feeding apparatus is disclosed in Foster U.S. Pat. No. 4,852,258. This device includes inertial feeding apparatus having feed effective means which automatically feeds line or flail in response to a line shortening condition.

Each of the foregoing types of line feeding apparatus has distinct disadvantages. Significantly, all of the foregoing types of line feeding apparatus include several relatively moving parts (in addition to the flail) which are subject to wear and breakage and, occasionally, unreliable operation even when new. Further, the need for a plurality of moving parts undesirably increases the overall cost of the apparatus, both in terms of material and labor needed to assemble same.

Also, the need to store the line on a rotatable spool renders the process of refilling the head with fresh line a complex and time-consuming task. Still further, a user may find it difficult to ascertain during operation when an additional length of line must be fed, and hence cutting efficiency may be reduced.

In addition to the foregoing problems, a significant amount of wastage typically occurs in conventional line feeding apparatus, inasmuch as the user has no way to know whether sufficient line has been dispensed except to actuate the feed mechanism until a portion of line is trimmed by a cutoff blade mounted on a shield of the trimmer. Also, it is common for tangles to occur and/or the line can retract into the head. Still further, utilizing a bumpfeed mechanism can be problematic, inasmuch as there may be no convenient surface nearby to utilize for the bumping operation. In fact, it is common for a user to actuate the bumpfeed mechanism on a grass covered surface, thereby causing a divot or other unsightly mark in the surface.

Yet another disadvantage results from the inherent nature of the bump process itself. Continued bumping of the string trimmer as a unit results in continued impacting of the components thereof. In addition to potentially loosening or damaging parts of the trimmer, a more serious condition can arise wherein components in the drive train, including the motor and other drive components, can be damaged.

SUMMARY OF THE INVENTION

In accordance with the present invention, a flail or line feeding device is simple in design so that the foregoing disadvantages are avoided.

More particularly, according to one aspect of the present invention, a flail feeding device includes an enclosure adapted to receive a flail and is characterized by the absence of parts which are relatively movable during operation thereof.

Preferably, the enclosure has a recess therein and further includes a post and an opening adjacent the post wherein the recess is adapted to receive a flail extending through the opening.

Also preferably, the enclosure includes two portions and the post is carried by one of the portions. According to a more specific aspect, the enclosure includes a hub joined to a cover and the opening is disposed in the cover and completely surrounds the post.

In accordance with a preferred embodiment, a guiding member is secured to the post and the guiding member includes a guiding surface spaced from an outer surface of the cover to define a flail passageway. Also, the guiding surface and an outer surface of the cover may be planar in shape.

Still further, in accordance with a preferred embodiment, the cover includes a wall extending into the recess to define a spool cavity and a feed cavity. The feed cavity may be disposed between the spool cavity and the opening.

According to a further aspect of the present invention, a flail feeding device includes a rotatable enclosure, a recess disposed within the enclosure and a post rotatable with the enclosure. An opening is disposed in communication with the recess adjacent the post and the recess is adapted to receive a flail extending through the opening about the post.

In accordance with yet another aspect of the present invention, a head for a powered implement includes a hub having an open end and rotatable about a rotational axis, a cover disposed over the open end of the hub to define a recess and a post rotatable with the hub about the rotational axis and spaced from at least a portion of the cover to form an opening in communication with the recess. The recess is adapted to receive a quantity of flail extending through the opening about the post.

Still further in accordance with another aspect of the present invention, a head for a string trimmer includes a hub having a base portion and a skirt portion terminating at a circumferential lip and a cover disposed on the hub in engagement with the circumferential lip and having a surface defining a central aperture wherein the hub and cover define a recess. A post is secured to the base portion of the hub and extends through the aperture without contacting the surface to define an opening. The cover further includes a wall extending into the recess and dividing the recess into a spool cavity and a feed cavity wherein a quantity of string is disposed in at least one of the spool cavity and the feed cavity.

The feeding device of the present invention is extremely simple in design. Further, the flail feeding function is completely automatic and requires no manual intervention by the operator of the implement with which the feeding device is used. Therefore, the disadvantages noted above regarding complexity, cost, inconvenience and damage to components of conventional flail feeding devices are minimized or reduced entirely.

DESCRIPTION OF THE PREFERRED EMBODIMENTS

Figure 1:
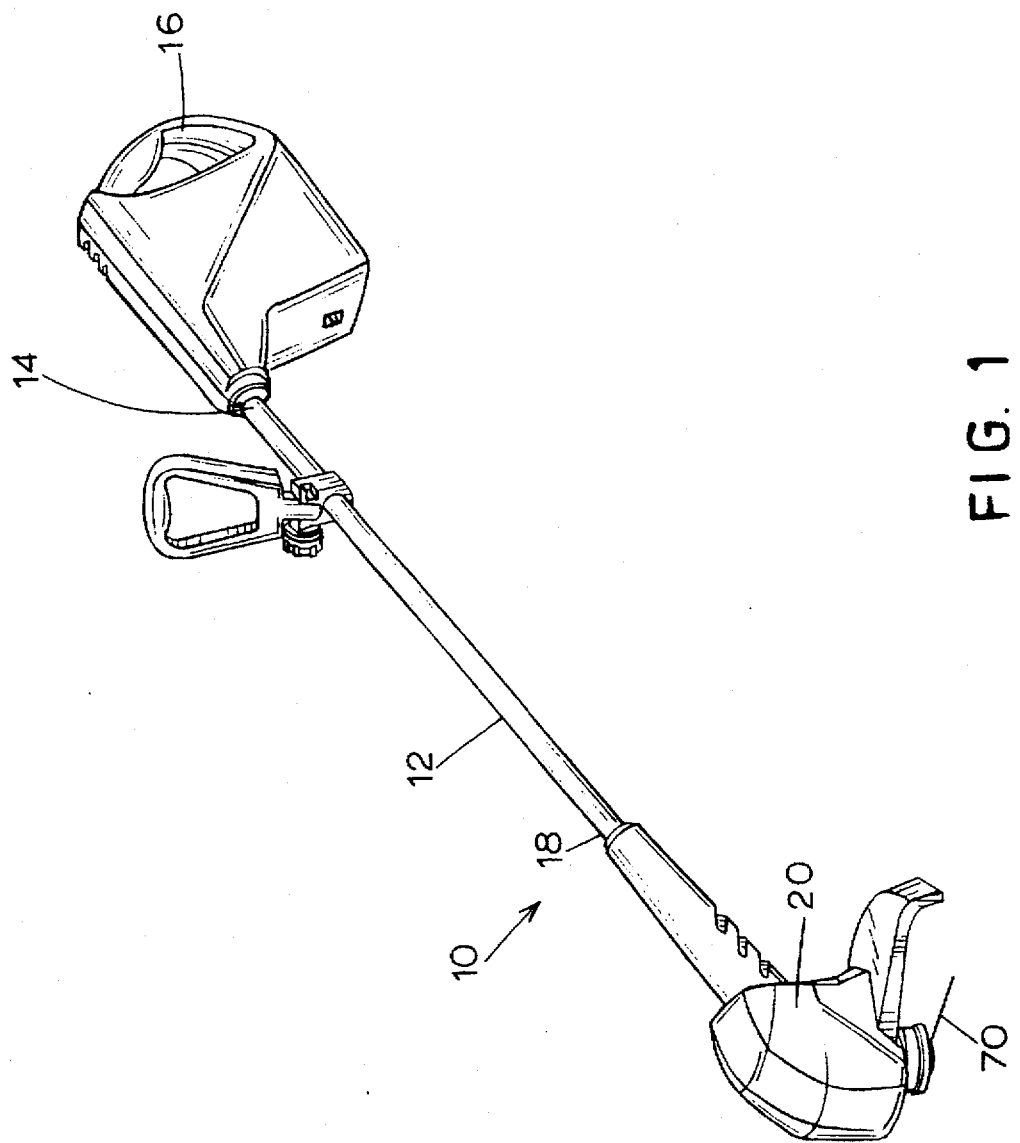
FIG. 1 is a perspective view of a string trimmer in which the present invention may be used.
Figure 2:
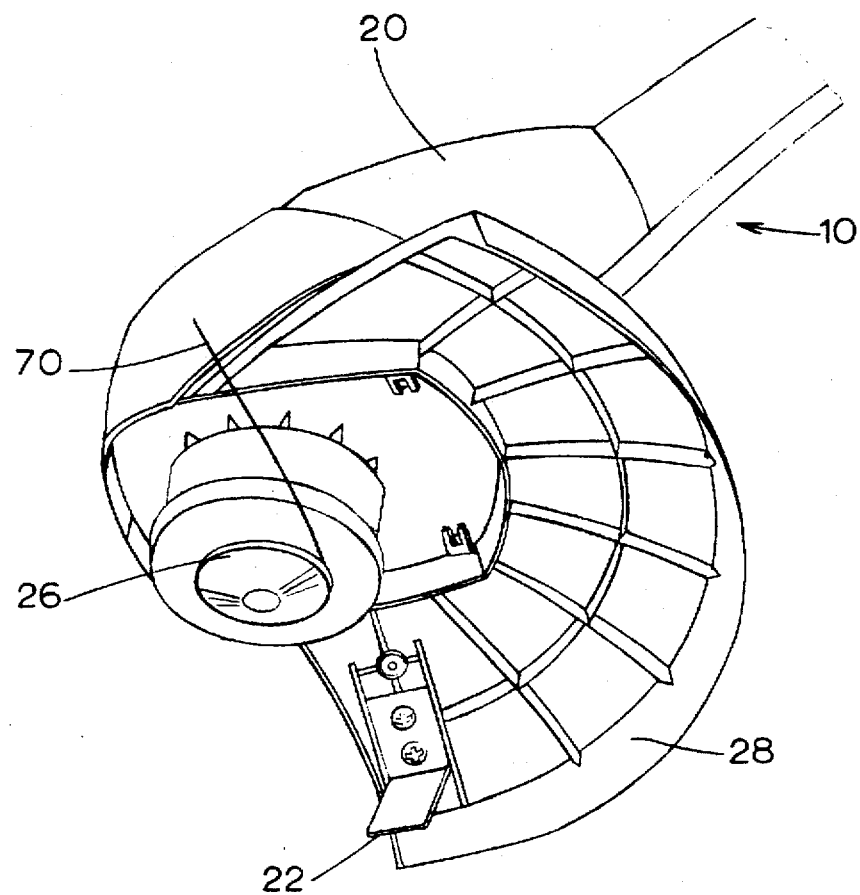
FIG. 2 comprises a perspective view taken from below of the lower end of the string trimmer of FIG. 1 illustrating a head incorporating the flail feeding device of the present invention.
Figure 3:
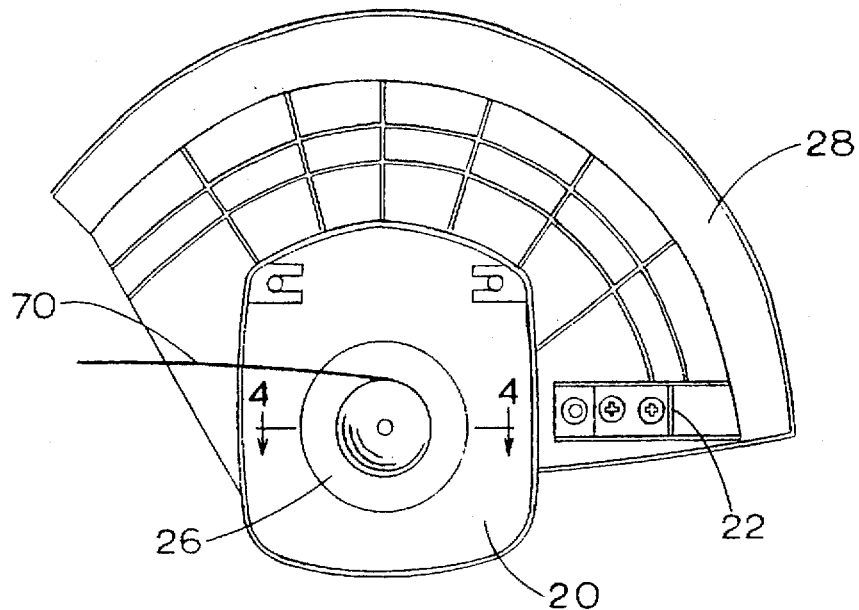
FIG. 3 comprises a bottom elevational view of the head of FIG. 2.
Figure 4:
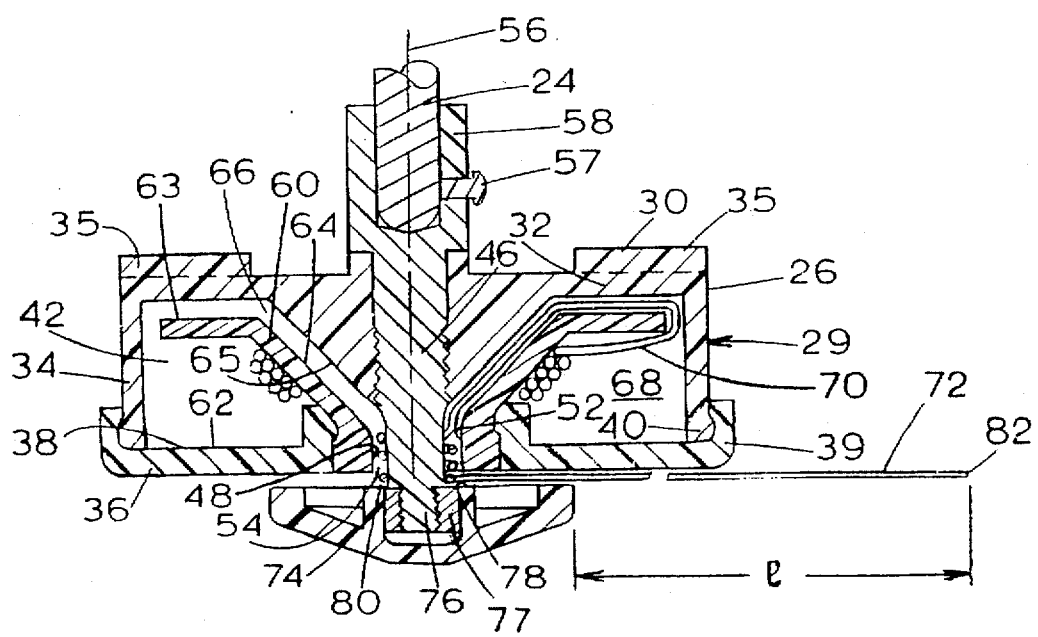
FIG. 4 comprises a partial sectional view taken generally along the lines 4—4 of FIG. 3.
Figure 5:
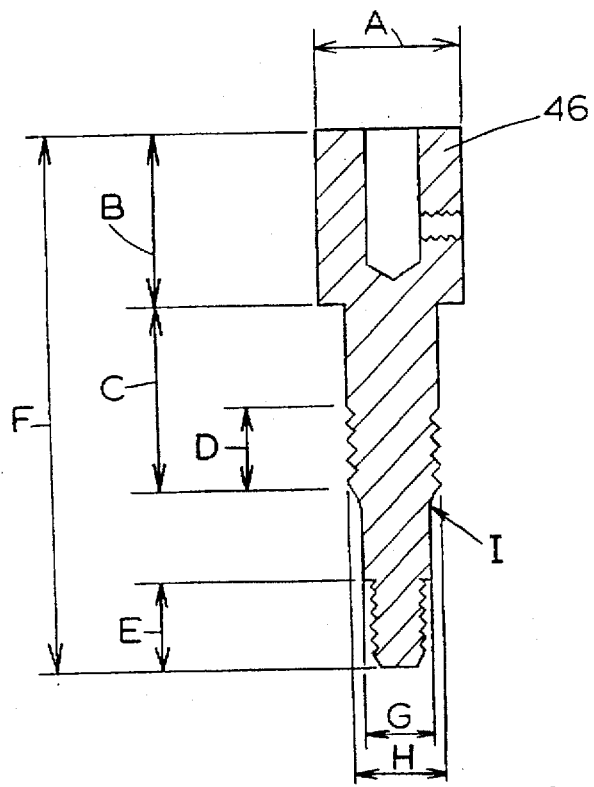
FIGS. 5–8 comprise sectional views of individual parts of the embodiment of FIG. 4 with exemplary dimensions.
Figure 6:
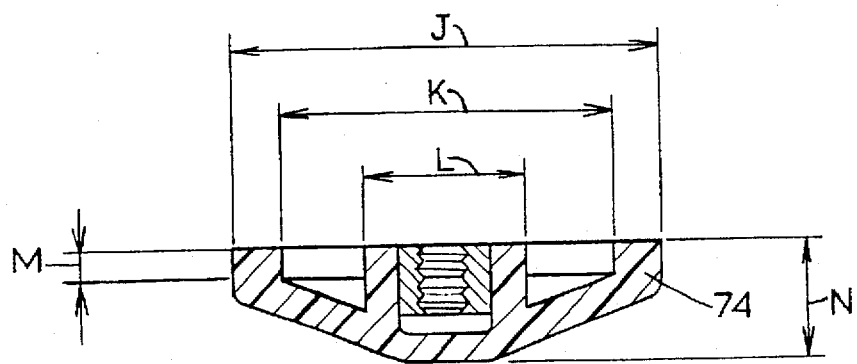
Figure 7:
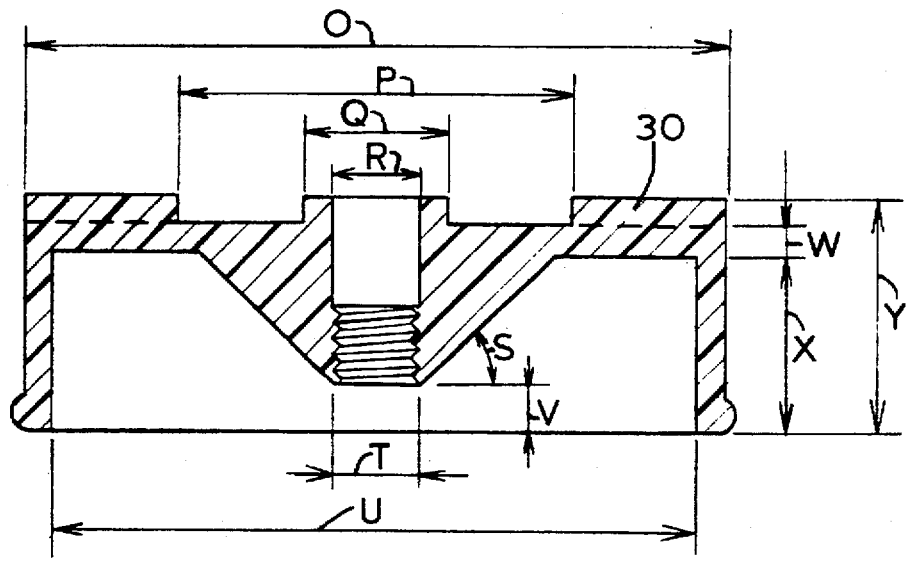

Referring now to FIG. 1, a powered lawn and garden implement in the form of a string trimmer 10 includes a boom 12 having an upper end 14 at which a handle 16 is attached and a lower end 18 at which a motor housing 20 is disposed. Referring also to FIGS. 2–4, the motor housing 20 encloses a motor (not shown) having an output shaft or spindle 24 (FIG. 4) coupled to a flail feeding device comprising a rotatable head 26. A shield 28 may be provided to shield an operator from debris thrown up by the trimmer 10. The shield 28 may also be equipped with a filament cut-off means in the form of a cut-off blade 22.

Referring specifically to FIG. 4, the head 26 includes an enclosure 29 which is adapted to receive at least one flail therein. The enclosure 29 includes a hub 30 having a base 32 and a downwardly depending skirt 34. Fan blades 35 may be formed integrally with and extend upwardly from the base 32. A cover 36 is secured over an open end 38 of the hub 30 by any convenient means, for example, by an interference fit between a circumferential upwardly extending lip 39 of the cover 36 and a circumferential rim 40 of the skirt 34. A recess 42 is defined by the hub 30 and/or the cover 36. A post 46 extends downwardly from the base 32 of the hub 30 into the recess and through an aperture 48 in the cover 36. At least a portion of the post 46 is spaced from a wall 52 defining the aperture 48 to form an opening 54. Preferably, the opening 54 completely surrounds the post 46, in which case no part of the post 46 contacts the cover 36. Still further in accordance with a preferred embodiment, the aperture 48 and post 46 are both circular in cross-section and coaxial, and hence the opening 54 is annular in shape. It should be noted that different cross-sectional configurations for the wall 52 defining the aperture 48 and the post 46 may instead be utilized, resulting in a different configuration of the opening 54.

Also preferably, the head 26 is rotatable about a rotational axis 56 which is preferably, although not necessarily, substantially coincident with a central longitudinal axis of the post 46.

The head 26 is coupled to the output shaft 24 of the motor by any convenient means, for example, by providing the post 46 with an upwardly extending extension 58 which is secured in any convenient fashion to the output shaft 24, such as by a set screw 57. Any other connection strategy could be used, for example, by forming the post 46 integral with the output shaft 24, if desired.

The cover 36 includes a frustoconical wall 60 which extends upwardly from a base surface 62 thereof and which terminates at a planar annular wall 63. The base surface 62 is preferably planar in shape. When the cover 36 is assembled on the hub 30, a surface 64 of the frustoconical wall 60 and a frustoconical surface 65 of the base 32 of the hub 30 together define a tapered feed cavity or passage 66 which is located within the recess 42. A spool cavity or line storage compartment 68 is defined below the walls 60, 63 within the recess 42 and is adapted to receive therein one or more lengths of flail in the form of a nylon string filament 70. Specifically, the filament 70 is wound within the compartment 68 to form a large diameter coil, extends through the passage 66 and an end 72 of length l extends outwardly through the opening 54.

It should be noted that the particular shape of the feed cavity or passage 66 and spool cavity or line storage compartment 68 is not critical, it being understood that such cavities could be of different shapes and/or dimensions. Also, the recess 42 may be subdivided into the feed cavity 66 and the spool cavity 68 by a different structure, for example, by a wall carried by the hub 30, if desired.

In fact, it may be possible to dispense with the need to subdivide the recess into a feed cavity 66 and a spool cavity 68, in which case the quantity of flail would be stored in coiled fashion within the recess with an end of the flail extending downwardly through the middle of the coil and out the opening 54.

A guiding member 74 is secured by any convenient means to an end 76 of the post 46, for example, by interengaging threads on a threaded insert 77 carried by the guiding member 74 and the end 76. The guiding member 74 includes an upper surface 78 which is preferably planar in shape and is disposed opposite the base surface 62 of the cover 36 to define a flail passageway 80 therebetween. The upper surface 78 preferably acts as a guiding surface to keep the end 72 of the filament 70 in substantially a planar path as the head 26 is rotated. It should be noted that the shape of the guiding member 74 is otherwise unimportant to the proper function of the head 26.

Once a quantity of flail is stored in the recess 42 with the end 72 extending outwardly through the opening 54, the motor may be operated to rotate the output shaft 24 and the head 26. Immediately following initiation of rotation of the head 26, inertial effects cause the filament 70 to wind several times about a small diameter coil winding surface or the post 46 to form a small diameter coil of filament smaller in diameter than the coil of filament in compartment 68. In addition, the length l of the end 72 extending outwardly away from the post 46 to a tip 82 increases or decreases until an equilibrium length is reached. Thereafter, if the length l of the end 72 of the filament 70 should change, for example, in a situation where the filament 70 strikes an object and a portion thereof is broken off, the filament 70 will extend outwardly until the equilibrium position is again reached. The theory of operation of the present invention in this regard is not fully understood; however, it appears that the filament 70 extends (or retracts) to the equilibrium position as a result of unbalanced forces acting thereon, including centripetal forces acting on the filament both inside and outside of the head and the air resistance encountered by the end of 72 of the filament 70 outside of the head 26. It appears that the equilibrium length is reached when the forces acting on the filament 70 are balanced.

In addition to the foregoing, the cross-sectional size of the post 46 affects the equilibrium length of the filament 70. That is, the larger the diameter of the post 46 (or the larger the cross-sectional dimension of the post 46 if the post is not round in cross-section), the longer the end 72 of the filament 70 extending outwardly from the post 46 will be when the equilibrium position is reached. Conversely, the equilibrium position can be made shorter by decreasing the diameter (or cross-sectional dimension) of the post 46.

It may also be that the equilibrium length is affected by other factors, such as rotational speed of the head 26, weight per unit length and/or diameter of the filament 70, shape of the post and/or other components of the head 26, and the like.

FIGS. 5–8 illustrate sample dimensions for the post 46, the guiding member 74, the hub 30 and the cover 36, respectively. These sample dimensions are provided only by way of illustration and not in a limiting sense (all dimensions are in inches except as otherwise indicated):

FIG. 5:

| Reference | Dimension |
|---|---|
| A | .500 |
| B | .625 |
| C | .625 |
| D | .313 |
| E | .290 |
| F | 1.875 |
| G | .250 |
| H | .3125 |
| I | .188 radius |

FIG. 6:

| Reference | Dimension |
|---|---|
| J | 1.50 |
| K | 1.19 |
| L | .560 |
| M | .09 |
| N | .410 |

FIG. 7:

| Reference | Dimension |
|---|---|
| O | 2.438 |
| P | 1.375 |
| Q | .500 |
| R | .315 |
| S | 45° |
| T | .320 |
| U | 2.250 |
| V | .160 |
| W | .100 |
| X | .600 |
| Y | .800 |

FIG. 8:

| Reference | Dimension |
|---|---|
| Z | 2.100 |
| AA | 1.260 |
| AB | 45° |
| AC | .090 |
| AD | .625 |
| AE | 2.625 |
| AF | 2.438 |
| AG | 1.000 |
| AH | .213 |
| AI | .313 |
| AJ | .375 |
| AL | .688 |

Figure 8:
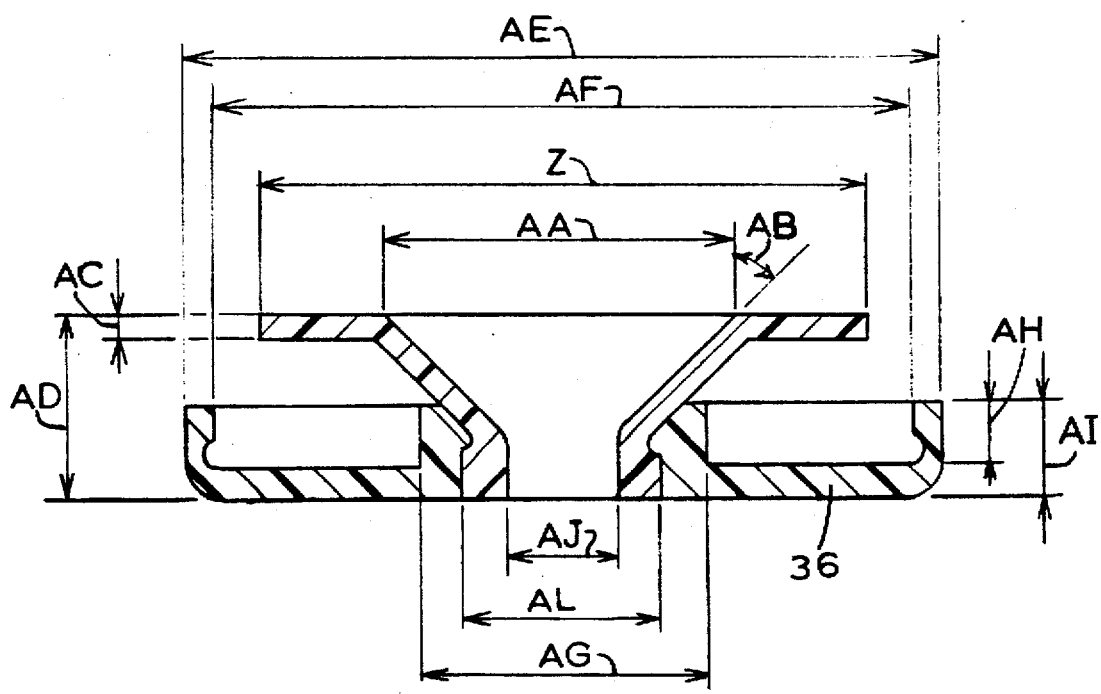

While FIG. 8 illustrates the cover 36 as comprising two separate pieces, the cover 36 may instead be of unitary construction, if desired.

Figure 9:
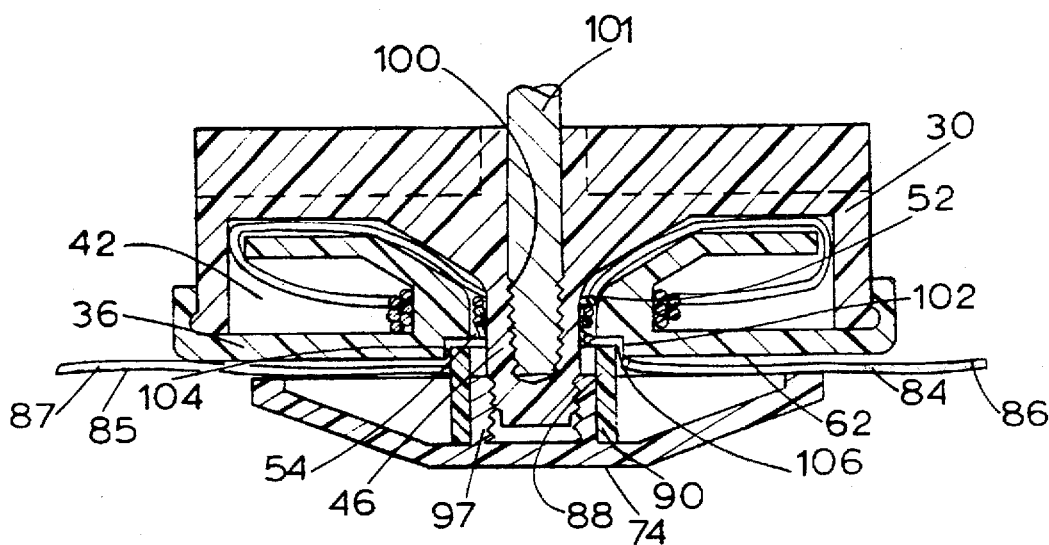
FIG. 9 comprises a sectional view similar to FIG. 4 of a further embodiment of the present invention.
Figure 10:
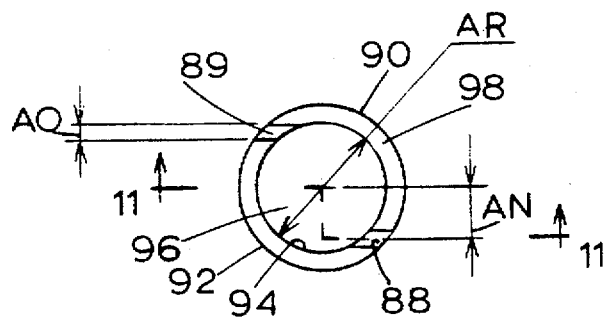
FIG. 10 comprises a plan view of the filament directing member of FIG. 9 with exemplary dimensions.
Figure 11:
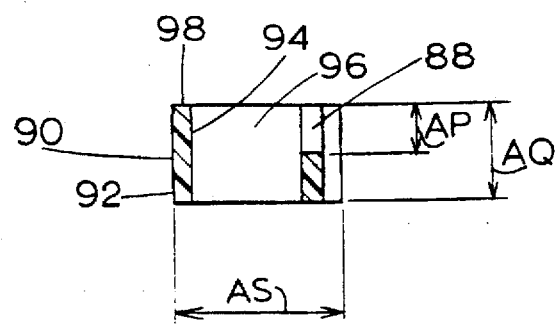
FIG. 11 is a broken sectional view taken generally along the lines 11—11 of FIG. 10.

FIGS. 9–13 illustrate an alternative embodiment flail feeding device or head wherein elements common with FIGS. 1–8 are assigned like reference numerals. Referring specifically to FIG. 9, a pair of flails 84, 85 are provided in the recess 42 and include ends 86, 87, respectively, which extend outwardly through the opening 54 and through first and second flail guides 88, 89 in an annular filament directing member 90. As seen in FIGS. 10 and 11 the filament directing member 90 further includes an annular outer surface 92 and an annular inner surface 94 defining an annular cavity 96 and is rotatable about the post 46.

Also, the cover 36 includes a stepped annular recess 104 at an inner portion thereof. The filament directing member 90 is disposed between the cover 36 and the guiding member 74 such that the post 46 and a cylindrical upstanding member 97 are disposed within the annular cavity 96 of the filament directing member 90 and such that a top surface 98 of the filament directing member 90 is oriented toward the planar base surface 62 of the cover 36 and extends upwardly into the stepped annular recess 104. The diameter of the inner surface 94 is slightly larger than the diameters (or largest cross-sectional dimensions, if non-circular) of the post 46 and the upstanding member 97 and the diameter of the outer surface 92 is slightly smaller than the diameter of the recess 104 so that the member 90 is freely rotatable.

Also, the embodiment of FIG. 9 dimensionally differs from the embodiment of FIG. 4 and further differs in that a central bore 100 is threaded to accept a threaded motor shaft 101 and the guiding member 74 is threaded directly on the post 46 without using the threaded insert 77.

The embodiments of FIGS. 4 and 9 operate similarly, except that the two flails 84, 85 are dispensed and are maintained in positions 180° opposite one another by the member 90. The 180° disposition keeps the flails 84, 85 counterbalanced against each other and prevents them from tangling.

FIGS. 10–13 illustrate sample dimensions for the embodiment of FIG. 9. Again, the sample dimensions are provided only by way of illustration and not in a limiting sense (all dimensions are in inches):

| FIG. 10: | |
|---|---|
| Reference | Dimension |
| AN | .280 |
| AO | .080 (Wide) |

| FIG. 11: | |
|---|---|
| Reference | Dimension |
| AP | .250 |
| AQ | .500 |
| AR | .680 |
| AS | .860 |

Figure 12:
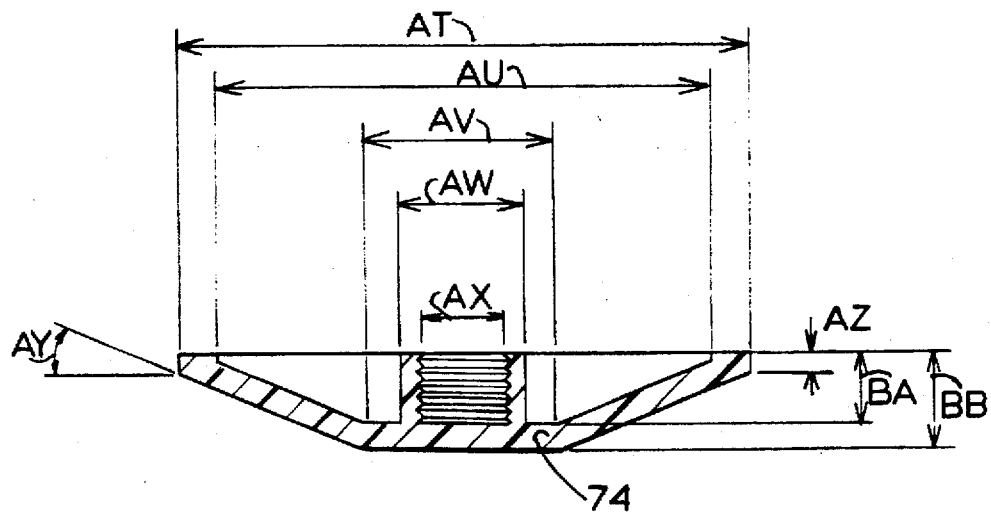
FIGS. 12 and 13 are sectional views of individual parts of the embodiment of FIG. 9 with exemplary dimensions.

| FIG. 12: | |
|---|---|
| Reference | Dimension |
| AT | 3.000 |
| AU | 2.625 |
| AV | 1.00 |
| AW | .660 |
| AX | .500 |
| AY | 22° 30' |
| AZ | .125 |
| BA | .375 |
| BB | .500 |

Figure 13:
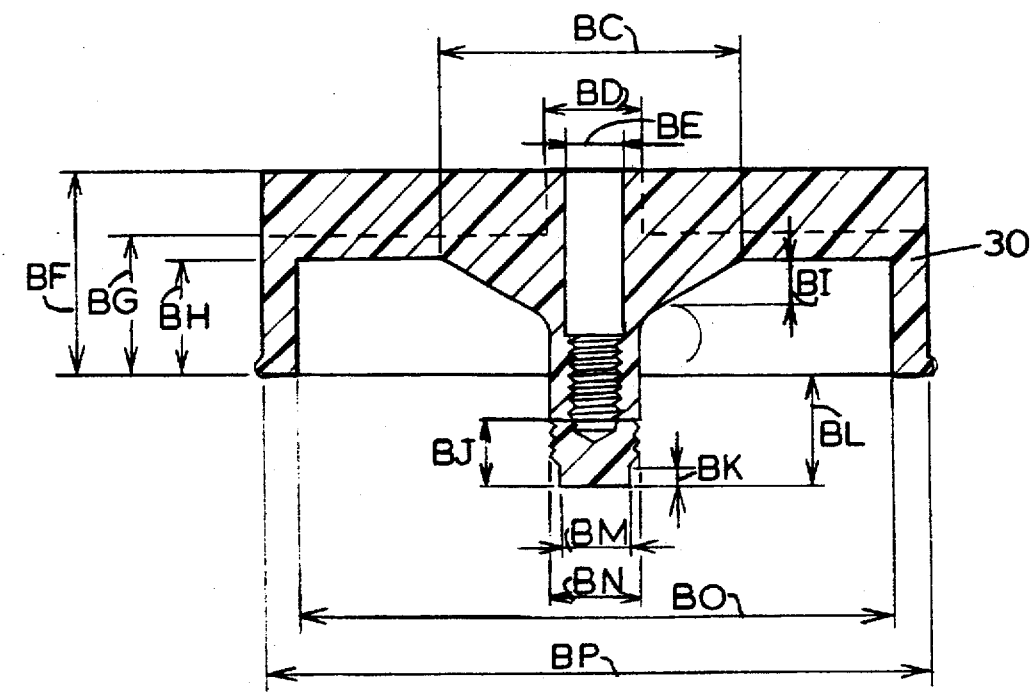

| FIG. 13: | |
|---|---|
| Reference | Dimension |
| BC | 1.600 |
| BD | .530 |
| BE | .3125 |
| BF | 1.075 |
| BG | .730 |
| BH | .615 |
| BI | .238 |
| BJ | .370 |
| BK | .09 |
| BL | .580 |
| BM | .420 |
| BN | .500 |
| BO | 3.125 |
| BP | 3.500 |

Figure 14:
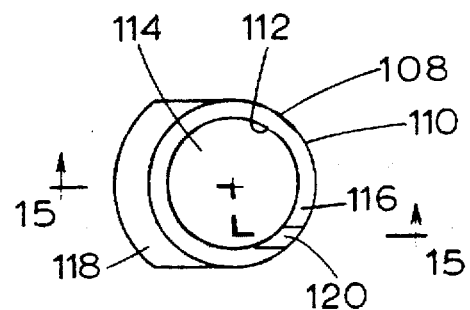
FIGS. 14 and 16 are plan views of alternative filament directing members.
Figure 15:
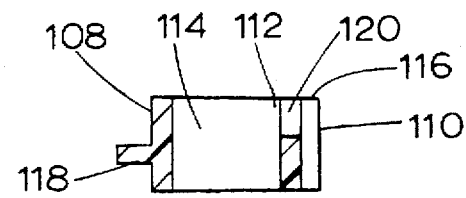
FIGS. 15 and 17 comprise broken sectional views similar to FIG. 11 taken along the lines 15—15 and 17—17 of FIGS. 14 and 16, respectively.

FIGS. 14 and 15 illustrate a further embodiment wherein the filament directing member 90 of FIG. 9 may be replaced by a rotatable balanced single filament directing member 108. As before, like elements are assigned like reference numerals. The member 108 includes an annular outer surface 110, an annular inner surface 112 defining an annular cavity 114, and an annular top surface 116 corresponding to the surfaces 92, 94 and 98, respectively. The balanced filament directing member 108 further includes a counterweight 118 extending outwardly from the annular outer surface 110, and a single flail guide 120 located opposite the center of mass of the counterweight 118. In this embodiment only a single flail is stored in the recess 42 having an end extending outwardly through the flail guide 120. As in the embodiment of FIG. 9, the member 108 rotates as flail is dispensed, and a potentially unbalanced condition is eliminated by positioning the counterweight 118 opposite the flail. Of course, the size (and hence the mass) of the counterweight is selected with reference to the equilibrium length of the flail and the mass per unit length of the string to minimize or eliminate an unbalanced condition.

Figure 16:
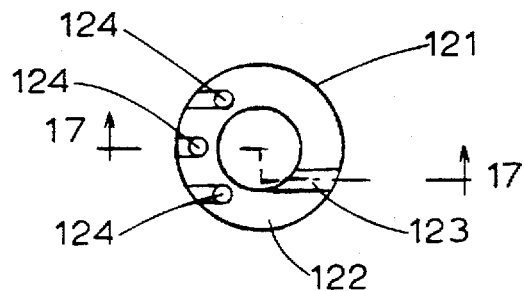
Figure 17:
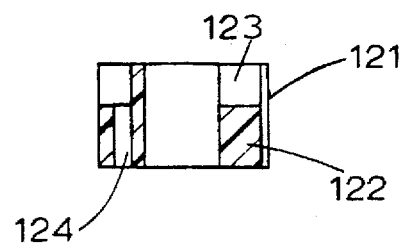

In a still further embodiment illustrated in FIGS. 16 and 17, the member 90 of FIG. 9 is replaced by a balanced single filament directing member 121 having a relatively thick wall 122, a flail guide 123 for a single flail end and one or more counterweights 124 disposed in bores opposite the flail guide 122. The embodiment operates in a fashion similar to the embodiment of FIGS. 14 and 15 to prevent an unbalanced condition when a single flail is dispensed by the head.

FIGS. 18–23 illustrate a still further flail feeding device or head 140 according to the present invention wherein elements common to the previously described figures are assigned like reference numerals.

Figure 18:
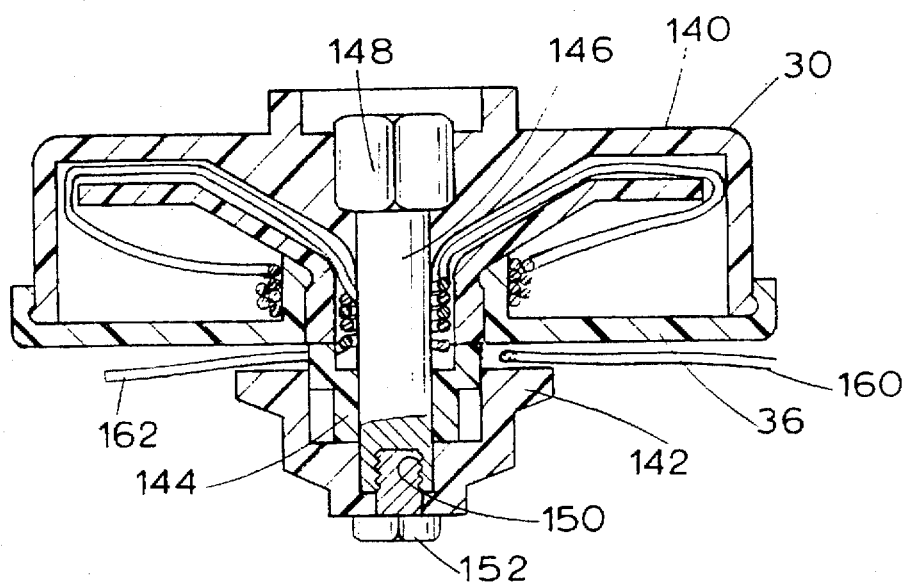
FIG. 18 comprises a partial sectional view of a further embodiment of the present invention.
Figure 20:
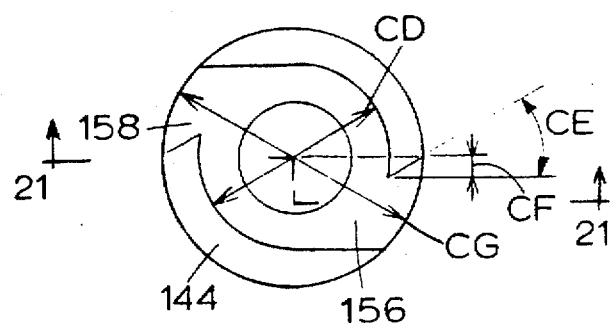
FIG. 20 comprises a plan view of the filament directing member of FIG. 18 with exemplary dimensions.
Figure 21:
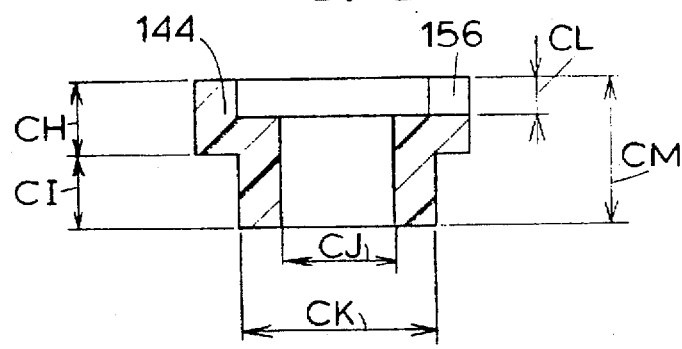
FIG. 21 comprises a broken sectional view taken generally along the lines 21—21 of FIG. 20.

The embodiment of FIG. 18 differs from the embodiment of FIG. 4 not only dimensionally, but also in the way in which the head 140 is secured to the motor spindle and the design of a guiding member 142 (which replaces the guiding member 74 of FIG. 4) and a filament directing member 144 (which replaces the member 90 of FIG. 9). Specifically, a cylindrical post 146 (corresponding to the post 46 of previous embodiments) extends fully through the head 140 and includes a threaded nut 148 captured in a hex-shaped recess and having internal threads at a first end which secure the head to a threaded motor spindle. The post 146 includes a central bore 150 at a second end which is threaded to accept a bolt 152 which secures the guiding member 142 to the post 146. The filament directing member 144 is captured between the guiding member 142 and the cover 36 and, as seen in FIG. 20, includes flail guides 156, 158 through which ends of a pair of flails 160, 162 extend.

The embodiment of FIG. 18 operates in the same fashion as the embodiment of FIG. 9. The embodiment of FIG. 18, like the embodiment of FIG. 9, is designed to accommodate a larger, more powerful driving means, such as a gas engine, than the embodiment of FIG. 4.

Figure 19:
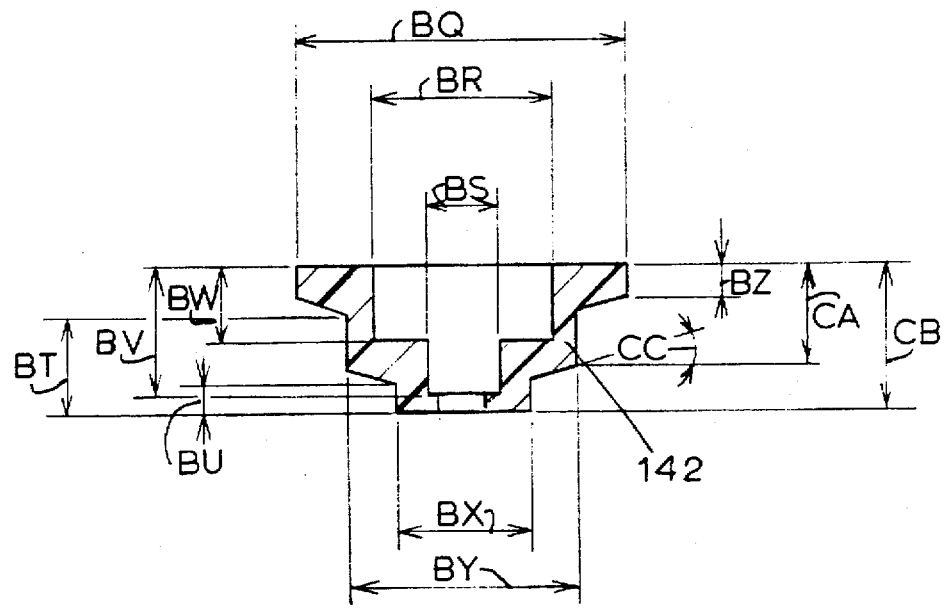
FIGS. 19, 22 and 23 comprise sectional views of individual parts of the embodiment of FIG. 18 with exemplary dimensions.
Figure 22:
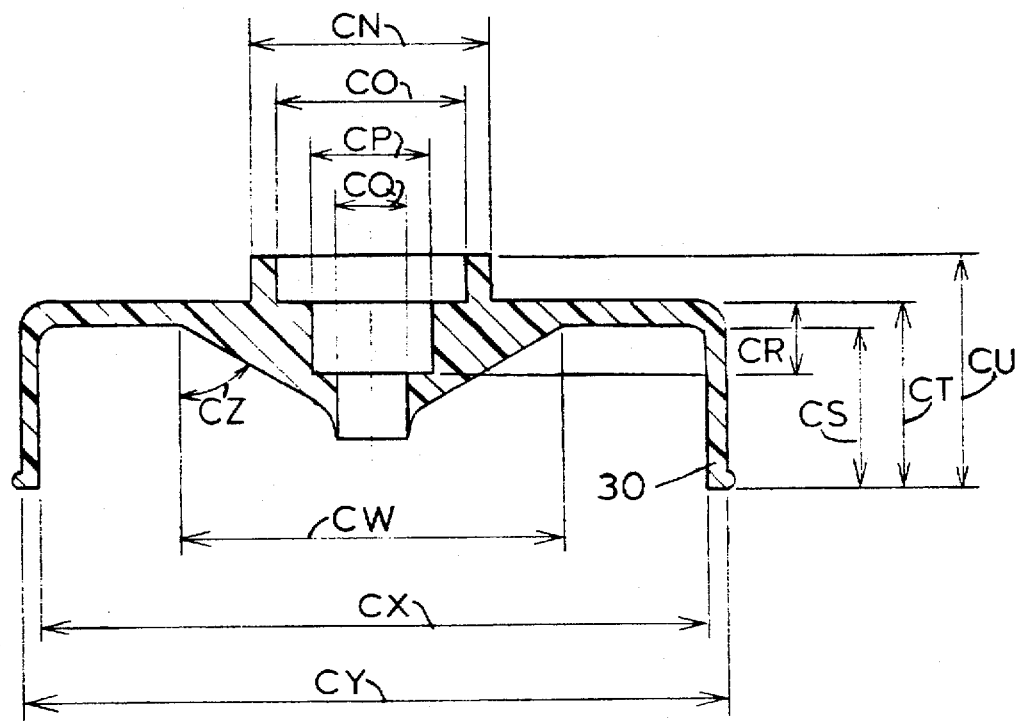
Figure 23:
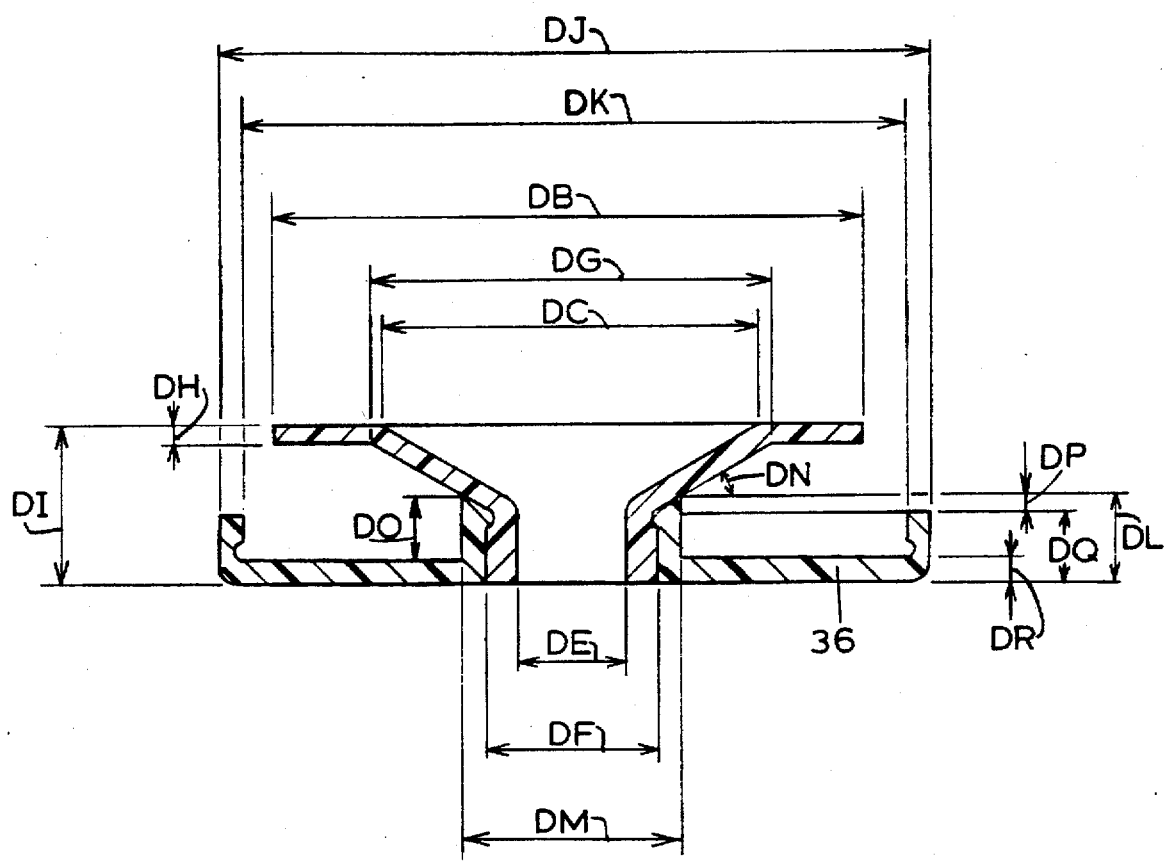

FIGS. 19–23 illustrate sample dimensions for the embodiment of FIG. 18. As before, these sample dimensions are provided only by way of illustration and not in a limiting sense (all dimensions are in inches):

| FIG. 19: | |
|---|---|
| Reference | Dimension |
| BQ | 1.75 |
| BR | .440 |
| BS | .375 |
| BT | .575 |
| BU | .193 |
| BV | .700 |
| BW | .410 |
| BX | .640 |
| BY | 1.11 |
| BZ | .160 |
| CA | .560 |
| CB | .810 |
| CC | 15° |

FIG. 20:

| Reference | Dimension |
|---|---|
| CD | .625 |
| CE | 30° |
| CF | .072 |
| CG | .675 |

FIG. 21:

| Reference | Dimension |
|---|---|
| CH | .220 |
| CI | .280 |
| CJ | .380 |
| CK | .625 |
| CL | .110 |
| CM | .500 |

FIG. 22:

| Reference | Dimension |
|---|---|
| CN | 1.250 |
| CO | .940 |
| CP | .625 HEX |
| CQ | .375 |
| CR | .410 |
| CS | .865 |
| CT | .990 |
| CU | 1.240 |
| CW | 2.000 |
| CX | 3.500 |
| CY | 3.700 |
| CZ | 30° |

FIG. 23:

| Reference | Dimension |
|---|---|
| DB | 3.250 |
| DC | 3.070 |
| DE | .635 |
| DF | .940 |
| DG | 2.150 |
| DH | .100 |
| DI | .865 |
| DJ | 3.900 |
| DK | 3.700 |
| DL | .491 |
| DM | 1.200 |
| DN | 30° |
| DO | .366 |
| DP | .116 |
| DQ | .375 |
| DR | .125 |

It should be noted that the present invention is not limited to use with a string trimmer, but instead may be used with any device wherein a flail or other elongate member is to be rotated in a circular path for cutting or any other purpose. The flail may be circular in cross-section or may be of any other cross-sectional configuration, including a configuration which results in a ribbon-like appearance or any other elongate appearance. Also, the filament 70 may be fabricated of nylon, fabric, metal or any other material Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A rotary flail feeding device having an enclosure defining a recess adapted to receive a large diameter coil of flail said enclosure having an exterior surface, a post in the enclosure, and a generally annular flail feeding opening in the exterior surface of the enclosure, said opening surrounding the post, the post including a small diameter flail winding surface adapted to be surrounded by a small diameter coil of flail.

2. The flail feeding device of claim 1, wherein the enclosure includes two portions and wherein the post is carried by one of the portions.

3. The flail feeding device of claim 1, wherein the enclosure includes a hub joined to a cover and wherein the opening is disposed in the cover and completely surrounds the post.

4. The flail feeding device of claim 1, further including a guiding member secured to the post.

5. The flail feeding device of claim 4, wherein the guiding member includes a guiding surface spaced from an outer surface of the cover to define a flail passageway.

6. The flail feeding device of claim 1, wherein the guiding surface and the outer surface of the cover are planar in shape.

7. The flail feeding device of claim 1, wherein the enclosure includes a hub and a cover secured to the hub.

8. The flail feeding device of claim 7, wherein the cover includes a wall extending into the recess to define a spool cavity and a feed cavity.

9. The flail feeding device of claim 8, wherein the feed cavity is disposed between the spool cavity and the opening.

10. The flail feeding device of claim 1 in combination with a flail, said flail including a large diameter coil in the recess, a small diameter coil surrounding the flail winding surface and an end extending out the opening.

11. The flail feeding device as in claim 1, in combination with a pair of flails, each flail including a large diameter coil of flail in the recess, a small diameter of coil of flail surrounding the flail winding surface and an end extending out through the opening.

12. The flail feeding device of claim 1 wherein the flail winding surface extends from the exterior surface of the enclosure a distance along the post into the enclosure.

13. A flail feeding device comprising:
an enclosure having an exterior surface, said enclosure rotatable about an enclosure axis;
a recess disposed within the enclosure surrounding the axis;
a stem adjacent the axis and rotatable with the enclosure, the stem including a flail winding surface; and
an opening in the exterior surface of the enclosure, said opening surrounding the stem and in communication with the recess.

14. The flail feeding device of claim 13, wherein the enclosure is of two-piece construction.

15. The flail feeding device of claim 13, wherein the enclosure includes a hub having an open end and a cover mounted over the open end.

16. The flail feeding device of claim 15, wherein the stem is spaced from the cover to define the opening.

17. The flail feeding device of claim 13, wherein the opening is annular in shape.

18. The flail feeding device of claim 13, wherein the enclosure includes a wall dividing the recess into a spool cavity and a feed cavity.

19. The flail feeding apparatus of claim 13, wherein the enclosure is rotatable about a rotational axis and wherein the stem includes a longitudinal axis substantially coincident with the rotational axis.

20. The flail feeding of claim 13, in combination with a single flail stored in the recess.

21. The flail feeding of claim 13, in combination with a pair of flails stored in the recess each having an end extending through the opening.

22. The flail feeding device of claim 21, further including a divider for maintaining the ends of the flails substantially 180 degrees opposite one another.

23. The flail feeding device of claim 23, further including a guiding member secured to the stem.

24. The flail feeding device of claim 23, wherein the guiding member includes a string guiding surface spaced from the opening.

25. The flail feeding device of claim 23, wherein the guiding member is threaded onto the end of the stem.

26. A head for a powered implement, comprising;

a hub having an open end and rotatable about a rotational axis;

a cover having an external surface, said cover disposed over the open end of the hub to define a recess;

an aperture in the external surface of the cover; and a stem rotatable with the hub about the rotational axis, said stem extending into the aperture and spaced from the cover at the aperture to form an annular opening in communication with the recess wherein the recess is adapted to receive a coil of a string extending through the opening and outwardly of the head.

27. The head of claim 26, wherein the stem is coupled to the hub.

28. The head of claim 26, wherein the hub includes a longitudinal axis substantially coincident with the rotational axis.

29. The head of claim 26, wherein the cover includes a wall defining an aperture and wherein the stem extends through the aperture without contacting the wall.

30. The head of claim 26, further including a guiding member secured to an end of the stem wherein the guiding member has a string guiding surface spaced from the opening.

31. The head of claim 30, wherein the guiding member is threaded onto the end of the stem.

32. The head of claim 26, wherein the cover includes a spool wall dividing the recess into a spool cavity and a feed cavity.

33. The head of claim 26, in combination with a string segment disposed in the recess.

34. The head of claim 26, in combination with a pair of string segments disposed in the recess.

35. The head of claim 34, further including a divider for maintaining ends of the string segments substantially 180 degrees opposite one another.

36. The head of claim 26 wherein the stem includes a small diameter string winding surface adjacent the opening.

37. A head for a rotary string trimmers comprising:

a hub having a base portion and a skirt portion terminating at a circumferential lip;

a cover disposed on the hub in engagement with the circumferential lip and having a surface defining a central aperture wherein the hub and cover define a recess;

a stem secured to the base portion of the hub and extending through the aperture without contacting the surface to define an opening;

the cover further including a wall extending into the recess and dividing the recess into a spool cavity and a feed cavity; and a quantity of string disposed in at least one of the spool cavity and feed cavity and extending out the opening.

38. The head of claim 37, wherein the cover wall is frustoconical in shape and is disposed opposite a frustoconical surface of the base portion whereby the feed cavity is tapered.

39. The head of claim 37, further including a guiding member secured to an end of the stem for guiding the string.

40. The head of claim 39, wherein the guiding member has a string guiding surface spaced from the opening.

41. The head of claim 40, wherein the guiding member is threaded onto the end of the stem and the string guiding surface and the cover define a passageway for the string.

42. The head of claim 37, wherein the quantity of string comprises a single string segment.

43. The head of claim 37, wherein the quantity of string comprises a pair of string segments.

44. The head of claim 43, further including a divider for maintaining ends of the string segments substantially 180 degrees opposite one another.

45. The head of claim 37, wherein the cover includes a circumferential flange in interfering contact with the circumferential lip.

46. The head of claim 37, wherein the stem and aperture are circular in cross section and the opening is annular in shape.

47. A rotary flail feeding apparatus comprising a head having opposed sides; an attachment member on the head adapted to attach the head to a rotary drive for rotating the head; an annular flail storage cavity within the head; a post rotatable with the head, said post extending through the center of the storage cavity to an end at one side of the head; a flail winding surface on the end of the post; and a wall surrounding the flail winding surface and spaced outwardly from the flail winding surface, said flail winding surface and wall defining an annular flail feeding passage having a first open end located within the head and communicating with said flail storage cavity and a second open end on said one side of the head adjacent the end of the post.

48. A rotary flail feeding device as in claim 47 wherein said flail feeding passage includes a first generally cylindrical portion surrounding the flail winding surface.

49. A rotary flail feeding device as in claim 48 including a guide member on the end of the post, said member spaced a distance from said one side of the head.

50. A rotary flail feeding apparatus as in claim 47 wherein said head includes a hub having a base at the side of the head opposite from said side of the head and an outer circumferential skirt; a cover at the one side of the head; and a disengagable connection joining the cover to the skirt.

51. A rotary flail feeding apparatus as in claim 47 including a continuous length of flail material, said length of flail material having a first portion wound in a coil in the flail storage cavity, a second portion wrapped around the flail winding surface on the post and a third portion extending out the second open end and away from the post to form a flail.

52. A rotary flail feeding device as in claim 51 including a guide member on the end of the post and wherein the third portion of the flail material extends between the one side of the head and the guide member.

53. A rotary flail feeding device as in claim 52 including a cylindrical flail directing member disposed between the one side of the head and the guide member, the flail directing member surrounding the post.

54. A rotary flail feeding device apparatus as in claim 53 including at least one flail guide opening in the flail directing member.

55. A rotary flail feeding device as in claim 53 including a plurality of flail guide openings in the flail directing member.

56. A rotary flail feeding device comprising a head having opposed sides, a rotary attachment member on the head, a central post rotatable with the head, said post extending from one side of the head across the head to a post end at the other side of the head, an annular flail storage cavity in the head surrounding the post, an annular wall adjacent and spaced a distance outwardly from the post, said post and wall defining an annular flail feed passage in the head communicating the flail storage cavity with an annular opening adjacent the end of the post.

57. A rotary flail feeding device as in claim 56 wherein the wall is located between the post and the cavity.

58. A rotary flail feeding device as in claim 57 including flail winding surface on the post adjacent the end of the post.

59. A rotary flail feeding device as in claim 58 including a guide member on the end of the post spaced outwardly from the other side of the head.

60. A rotary flail feeding device as in claim 56 including a continuous length of flail material having a wound coil in the flail storage cavity, a first portion extending from the coil through the passage, a second portion wrapped around the post adjacent to the other side of the head and a third portion extending outwardly from the annular opening.

61. A method of automatically dispensing a length of flail material from a rotary head of the type including an annular flail storage cavity and a large diameter wound coil of flail material in the cavity, comprising the steps of:

(a) rotating the head and the coil of flail material; and (b) feeding rotating flail material from the coil radially inwardly, winding the coil material around a surface located at the center of the cavity to form a number of small diameter coils of flail material on the surface, and then extending the end of the flail material outwardly from the head through an annular opening to form a flail extending outwardly from the opening and having a free end.

62. The method of claim 61, comprising the steps of:

(c) removing material from the free end of the flail to reduce the length of the flail; and (d) reestablishing the length of the flail by feeding additional flail material from the large diameter coil around the surface and out the opening.

63. A method of dispensing flail, the method comprising the steps of:

(a) rotating a large diameter coil of flail about an axis extending through the coil;

(b) rotating a small diameter coil winding surface around said axis together with the large diameter coil of flail; and (c) extending a rotating portion of flail having an end from the large diameter coil of flail to the small diameter coil winding surface, winding such portion around said surface to form a rotating small diameter coil of flail located radially inwardly of the large diameter coil of flail, and extending the end of the rotating small diameter coil of flail through an annular opening surrounding the small diameter coil winding surface and away from the axis.

64. The method of claim 63 including the step of altering the length of the rotating end of the portion of fail in response to rotational and air resistance forces.

65. The method of claim 64 including the step of maintaining the end of the portion of flail at an equilibrium length.

66. A method of dispensing flail from a head having an exterior surface, an aperture in the exterior surface defining a wall, an interior recess and a post with an end of the post located in the aperture to form a generally annular opening between the post and wall, comprising the steps of:

(a) placing a coil of flail in the interior recess;

(b) extending flail from the coil through the flail feeding opening and outwardly of the head; and (c) rotating the head to wind the flail in the opening around the post and establish an equilibrium length of flail extending from the head.

67. The method of claim 66 including the step of:

(d) rotating the head about an axis extending through the post.

68. A method of dispensing flail material from rotary head of the type having a coil winding member with an end at one side of the head and an annular feeding passage surrounding the coil winding member and extending along the member to an annular opening at the side of the head, including the steps of:

a) positioning a length of flail material in the passage with an end portion of the flail material extending out the annular opening;

b) rotating the head, coil winding member and length of flail material about an axis extending through the coil winding member; and c) winding the flail material in the passage around the coil winding member to form a first coil of flail material engaging the coil winding member and a rotary flail extending radially outwardly from the annular opening and having an inner end connected to the coil and an outer free end.

69. The method of claim 68 including the steps of:

d) shortening the length of the rotary flail by removing flail material from the outer free end of the rotary flail; and e) lengthening the rotary flail by unwinding flail material from the coil and adding the unwound flail material to the inner end of the rotary flail.

70. The method as in claim 69 including the step of:

f) winding additional flail material around the coil winding member.

71. The method as in claim 70 including the steps of:

g) providing a second coil of flail material joined to the length of flail material; and h) feeding flail material from the second coil to the first coil.

72. The method as in claim 71 including the step of:

i) positioning the second coil of flail material in the head surrounding the first coil of flail material.

* * * * *

UNITED STATES PATENT AND TRADEMARK OFFICE
CERTIFICATE OF CORRECTION

PATENT NO. : 5,743,019
DATED : April 28, 1998
INVENTOR(S) : Robert C. Berfield

It is certified that error appears in the above-identified patent and that said Letters Patent is hereby corrected as shown below:

In the Title Page:
[*] Notice:, line 3, change "5,672,897" to --5,675,897--.
[56] References Cited, Column 2, line 22, delete "1 8" and substitute --1-8-- therefor; line 29, change "Sourebook" to -- Sourcebook--.

In the Specification:
Column 1, line 19, change "string" to --flail--.

In the Claims:
Claim 1, line 3, after "flail" insert --,--.
Claim 6, line 1, change "1" to --5--.
Claim 11, line 3, following "diameter" delete 'of'.
Claim 23, line 1, following "claim" change "23" to --13--.
Claim 37, line 1, changer "trimmers" to --trimmer--.
Claims 47, 50 and 51, line 1, change "apparatus" to --device--.
Claim 54, line 1, delete "apparatus".

Signed and Sealed this

Eighth Day of September, 1998

Attest:

BRUCE LEHMAN

Attesting Officer      Commissioner of Patents and Trademarks